United States Patent
Witter et al.

(10) Patent No.: US 9,399,184 B2
(45) Date of Patent: Jul. 26, 2016

(54) DEFLAGRATION SUPPRESSION SCREEN FOR PORTABLE CYCLONIC DUST COLLECTOR/VACUUM CLEANER

(71) Applicants: Robert M. Witter, Englewood, FL (US); Jeffrey Hill, Cicero, NY (US); John J. Fitzsimmons, Clay, NY (US)

(72) Inventors: Robert M. Witter, Englewood, FL (US); Jeffrey Hill, Cicero, NY (US); John J. Fitzsimmons, Clay, NY (US)

(73) Assignee: Oneida Air Systems, Inc., Syracuse, NY (US)

( * ) Notice: Subject to any disclaimer, the term of this patent is extended or adjusted under 35 U.S.C. 154(b) by 660 days.

(21) Appl. No.: 13/765,311

(22) Filed: Feb. 12, 2013

(65) Prior Publication Data

US 2014/0223689 A1 Aug. 14, 2014
US 2016/0166124 A9 Jun. 16, 2016

Related U.S. Application Data

(63) Continuation-in-part of application No. 12/607,122, filed on Oct. 28, 2009, now Pat. No. 8,393,050, and a continuation-in-part of application No. 13/029,243, filed on Feb. 17, 2011, now Pat. No. 8,496,719.

(60) Provisional application No. 61/306,056, filed on Feb. 19, 2010, provisional application No. 61/315,695, filed on Mar. 19, 2010.

(51) Int. Cl.
| | |
|---|---|
| *A47L 9/10* | (2006.01) |
| *A47L 9/20* | (2006.01) |
| *B01D 46/04* | (2006.01) |
| *B01D 50/00* | (2006.01) |
| *B01D 46/00* | (2006.01) |
| *A47L 9/16* | (2006.01) |
| *B04C 9/00* | (2006.01) |

(52) U.S. Cl.
CPC ........... *B01D 46/0093* (2013.01); *A47L 9/1666* (2013.01); *B01D 46/0068* (2013.01); *A47L 9/20* (2013.01); *B04C 2009/002* (2013.01)

(58) Field of Classification Search
CPC ... B01D 46/0068; B01D 46/0093; A47L 9/20
USPC ................................ 15/353, 352; 55/337, 302
See application file for complete search history.

(56) References Cited

U.S. PATENT DOCUMENTS

| | | | | |
|---|---|---|---|---|
| 4,268,289 | A * | 5/1981 | Polaner | 55/486 |
| 4,476,608 | A * | 10/1984 | Rasmussen | 15/353 |
| 4,995,137 | A * | 2/1991 | Reichborn | 15/327.1 |
| 5,066,315 | A * | 11/1991 | Haberl et al. | 95/271 |
| 5,746,795 | A * | 5/1998 | Witter | 55/472 |
| 6,129,775 | A * | 10/2000 | Conrad et al. | 55/337 |
| 7,282,074 | B1 * | 10/2007 | Witter | 55/300 |
| 7,867,304 | B2 * | 1/2011 | Stewen et al. | 55/302 |
| 8,172,930 | B2 * | 5/2012 | Barkdoll | 96/232 |
| 8,377,160 | B2 * | 2/2013 | Witter | 55/337 |
| 2008/0083200 | A1 * | 4/2008 | Gruber et al. | 55/385.3 |
| 2014/0223690 | A1 * | 8/2014 | Witter et al. | 15/353 |

* cited by examiner

*Primary Examiner* — Bryan R Muller
(74) *Attorney, Agent, or Firm* — Bernhard P. Molldrem, Jr.

(57) ABSTRACT

A cyclonic portable vacuum cleaner/dust collector has a cyclonic chamber and a filter chamber. The filter chamber contains a filter cartridge with a hollow core positioned over the discharge opening of a motor plate that closes the filter chamber. A vacuum blower is mounted on the motor plate, with an intake tube at the discharge opening of the motor plate. An anti-deflagration screen mounted upon the discharge opening of the cover plate of the filter chamber. The anti-deflagration screen is in the form of a metal mesh creating a multiplicity of small passages to permit exhaust air flow from the filter chamber but blocking any flame front. The screen may be hemispherically domed.

12 Claims, 5 Drawing Sheets

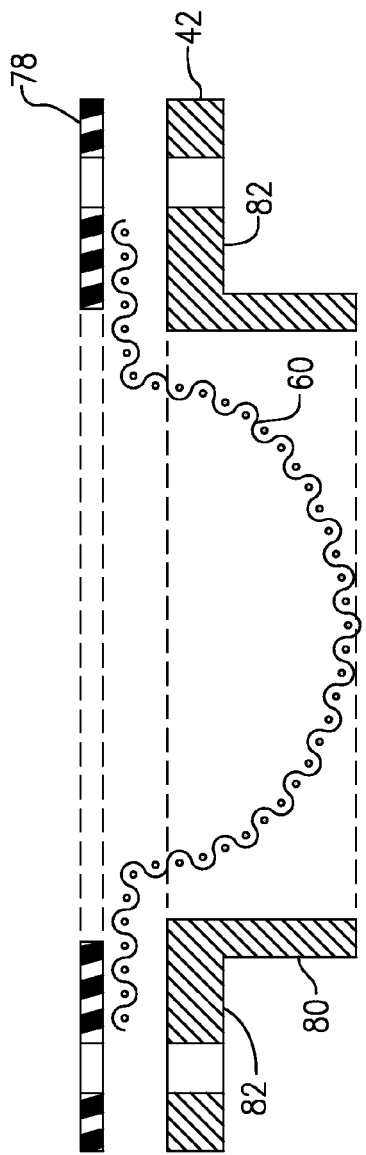
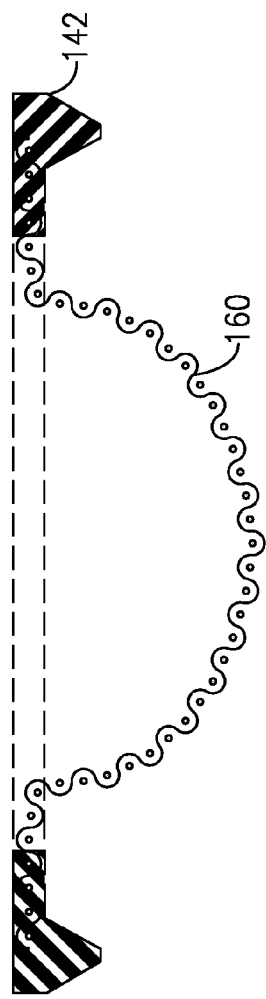

DEFLAGRATION SUPPRESSION SCREEN FOR PORTABLE CYCLONIC DUST COLLECTOR/VACUUM CLEANER

This is a continuation-in-part of application Ser. No. 12/607,122, filed Oct. 28, 2009, now U.S. Pat. No. 8,393,050, and continuation-in-part of application Ser. No. 13/029,243, filed Feb. 11, 2011, now U.S. Pat. No. 8,496,719, which claims priority under 35 U.S.C. 119(e) of provisional patent application Ser. No. 61/306,056, filed Feb. 19, 2010 and Ser. No. 61/315,695, filed Mar. 19, 2010. The disclosures of these are incorporated by reference herein.

BACKGROUND OF THE INVENTION

This invention may be embodied in heavy-duty vacuum cleaners of the type intended for workshop use, such as in wood shops, machine shops, or for industrial applications, namely, a hybrid shop vacuum/dust collector, having a higher capacity (more CFM) than a standard shop vacuum. The invention is more particularly concerned with an improvement in a heavy duty portable vacuum in which there are a two or more dust separation stages, with the large majority of the dust being separated cyclonically and deposited into a drum or barrel, and with the remaining dust that is carried in the vacuum machine air stream being filtered out in a final filter, so that the vacuum cleaner machine exhausts clean, filtered air into the ambient. A vacuum fan or blower in the unit pulls the air stream through the final filter and exhausts it as filtered air into the ambient.

Industrial vacuum cleaners and shop vacuum cleaners are often employed for picking up dust that has accumulated on the shop floor and on surfaces of equipment, or may also be connected to a dust outlet of a dust-producing tool, i.e., wood working machines, such as sanders, joiners, and the like, or machines that process metals, plastics, or other composites such as concrete or stone. In these industrial vacuum devices, there is typically a vacuum head and a drum or barrel. The vacuum head has a blower that is powered by an electric motor to induce a suction to draw a stream of air into the machine. The airstream is then directed into the barrel, where dust collects. From there, the air stream passes though a bag filter or other filter, and is exhausted to the ambient.

In most cases, the vacuum filter does not filter out fine dust, and there is always at least some of the dust that passes out and back into the ambient air. This airborne fine dust can present a health hazard, and in a wood shop environment airborne particulates constitute a serious quality issue as the airborne dust can contaminate varnish or other wood finishes.

The dust that is collected can quickly clog and blind the filter also, which limits air flow and diminishes the efficiency of the vacuum cleaner. Moreover, filling of the filter material requires that the vacuuming operation be interrupted frequently for cleaning and/or replacing of the filter.

A shop-type vacuum cleaner with a cartridge type final filter to capture fine dust particles has been proposed previously, and an example of such a shop vacuum is described in U.S. Pat. No. 5,069,696. In that case, an externally-mounted filter is located in the exhaust air stream in a housing that is disposed outside the vacuum machine drum or canister. This arrangement exhausts significantly cleaner air back into the ambient, but because the air passes directly from the main collection drum out to the filter housing, the filter accumulates dust quickly and requires frequent cleaning for effective operation.

It has been proposed previously to employ a cyclonic separator in line in a vacuum hose in advance of a shop vacuum cleaner for pre-separating particulate matter, and then with the outlet pipe of the cyclonic separator connecting to the inlet of the vacuum cleaner. This arrangement is described, for example, in U.S. Pat. No. 7,282,074. This system can result in removal of about ninety percent, or more, of the dust from the air stream ahead of the vacuum cleaner, so that the vacuum cleaner operates longer and more efficiently in most applications. However, this arrangement requires attaching the cyclone as a separate element in between the shop vacuum cleaner and the dust producing tool or dust pick-up tool.

The portable vacuum and dust collector can be used in cabinetmaking, carpentry and similar trades, in which a flammable process dust is directed to a dust storage drum and in which the air that is separated from the dust is returned to the ambient. In equipment of this type is advantageous that the dust separator vacuum cleaner incorporate a feature for suppressing or arresting flame that may come about by inadvertent ignition of the dust in the process air stream.

A conventional flame arrester, deflagration arrester, or flame trap is a piece of equipment installed in an industrial process to stop the propagation of a deflagration traveling along a pipeline by extinguishing the flame. Flame arresters are used on storage tank vents, fuel gas pipelines, storage cabinets, the exhaust system of internal combustion engines, Davy lamps and ovenproof drums. Flame arresters function by forcing a flame front through channels that are too narrow to permit the continuance of a flame. These passages can be regular, like wire mesh, or irregular, such as those in random packing or tight screening where the heat from the flame propagation is conducted to the metal screen or mesh lowering the heat output and containing the flame front.

Such deflagrations may occur in dust collection systems that use filters, (typically pleated cartridge filters) from dust extracted from dust generating tools and processes. Flammable dust in suspension when ignited can deflagrate or burn quickly, producing flame propagation that radiates out from the source of combustion. Dust collection systems that experience this type of upset can explode unless adequately protected or vented to atmosphere. This invention will eliminate or reduce flame propagation from a deflagration that is vented through a filter (e.g., pleated cartridge filter), so that the flame front is suppressed before the separated air exits to ambient air. The conventional technique employs a semi-passive system where the deflagration is diverted through a pressure panel or controlled gate to a flame-quenching or flame-squelching device (i.e., "quelching"). These can be very expensive and complex, requiring gates, dampers, and abort gates that have to be timed electronically and must actuate in small fractions of a second. Cyclone systems are particularly difficult to adapt to the conventional technique because the flame from a deflagration must be diverted, but at the same time the outlet flow from the system must be simultaneously blocked off, requiring complex and expensive sensors and controls, and also requiring elaborate engineering control equipment.

OBJECTS AND SUMMARY OF THE INVENTION

Accordingly, it is an object of this invention to create a combined vacuum and a high energy efficiency cyclonic separator so that the device has an efficient but simplified design, and which incorporates a flame or conflagration suppressor which is of simple, straightforward design to operate reliably without impairing the operation of the vacuum unit.

It is a more specific object to provide a flame suppressor that is adapted for use in vacuum cleaner which efficiently removes nearly all of the dust from the vacuum air stream, returning clean, filtered air to the ambient, without danger of igniting airborne dust in the ambient.

It is a further object of this invention to provide a vacuum cleaner which can operate for an extended period without need to unclog or clean the exhaust air filter.

An important object is to provide a powerful and heavy-duty vacuum cleaning machine that is light-weight and portable, can operate safely in an environment that contains flammable process dust, and can be easily wheeled into place.

Another object is to provide a vacuum cleaner having conflagration suppressor that does not impede operation of a final filter nor of a pulse cleaning feature that allows the user to produce a reverse pulse of air flow to drive dust off the final filter.

According to an aspect of the invention, a heavy duty portable vacuum cleaner has a conic body that is generally defined by a conic wall or shell. A top plate closes off a wide upper end of the conic wall. A narrow nose, situated at a lower end of the conic wall, serves as dust outlet. In one embodiment, the top plate has a central air passage. A second plate or disc is affixed within the conic body at a level that is about midway between the lower end and the upper end of the conic body. This second plate serves as the upper wall of a cyclonic chamber between the second plate and the nose of the conic body. The second plate also serves as the lower wall of a filter chamber above the divider plate, i.e., between the second plate and the top plate. The second plate can have a shallow conic shape, i.e., concave shape sloping towards a central passage, with a vortex tube descending from the central passage into the cyclonic chamber. The cyclone second plate is adapted to return dust pulsed from the filter down to the dust collection drum.

An air inlet conduit penetrates the conic wall just below the second plate and is adapted to introduce into the cyclonic chamber a flow of air in which dust particles are entrained. The air inlet conduit is adapted to attach to a flexible vacuum hose, with the hose being connected to a dust pickup tool, or to dust generating equipment such as a saw, joiner, sander, etc.

A dust collection drum, i.e., a barrel or canister, is positioned below the nose of the conic body, and has a lid that closes off the top or mouth of the dust collection drum. The lid has a dust inlet opening at its center. A boot, collar, or flange couples the nose of the conic body with the inlet opening of the lid. Dust that is separated in the cyclonic chamber from the air flow drops from the nose, through the inlet opening, into the dust collection drum. There should be a generally air-tight dust seal with both the nose and the lid to preclude leakage of external air into the cyclonic chamber and/or into the drum.

A final filter, e.g., a generally cylindrical cartridge filter, which may be a HEPA filter, is mounted on the lower side of the upper plate, at the center so as to cover the air passage. The filter is suspended within the filter chamber, and is adapted to filter the air that leaves the vortex tube and enters the filter chamber from the central passage of the second plate. This air is filtered before the air leaves through the central air passage of the upper plate. The final filter cartridge is sealably disposed against an under side of the top plate and surrounds the air passage.

A vacuum blower is supported upon the upper plate or motor plate. The blower has an inlet tube that communicates with the central air passage in the upper plate. Favorably, the blower is covered with a somewhat cylindrical shroud, which may have a lining of a sound absorptive material. This material may be porous to air, at least at the top, to permit the air to exhaust without to the ambient much resistance. To facilitate portability, the machine has a wheeled carriage, e.g., with wheels or casters at the base of the dust collection drum. Alternatively, the unit may be wall-mounted, using a suitable wall bracket.

Favorably, there may be a mounting ring disposed at the top end of the conic body affixed just inside the upper rim, i.e., at an inner periphery of the wide upper end of the conic wall, with the top plate or motor plate resting atop the mounting ring. An annular gasket or similar seal or gland is disposed between the mounting ring and the periphery of said upper plate.

A series of clamps are disposed around the periphery of the wide upper end of the conic wall for releasably clamping the top plate against the mounting ring with the gasket compressed between them. The clamps can release the top plate (here serving as a motor plate), which can be lifted out to change the filter cartridge, when needed.

In an illustrated embodiment, the vacuum blower is mounted with its rotary axis vertical, and with its inlet conduit disposed on the rotary axis and also positioned on the machine axis. The inlet conduit of the vacuum blower is placed into or against the air passage of the top plate, to draw air from the filter chamber and exhaust it to the ambient. In this case, the air in the filter chamber passes from the radially outer side of the filter, through the medium, into the open core of the filter, and out through the air passage in the top plate and through the vacuum blower.

The top cover or shroud encloses the vacuum blower, and has a number of vent openings to permit exhaust air from the blower to escape to the ambient.

In some embodiments, a releasable plug, flap or plate member is seated against an opening in the top plate, near its central air passage. In a preferred implementation, this can be embodied in a flat ring that lies onto a generally arcuate opening (formed as a series of partial arcuate openings) surrounding the air passage or discharge opening in the top plate or motor plate. This can be unseated by pulling or pushing on a handle or lever outside the shroud, where the inner end or ends of the lever are attached to the flat ring. This feature is actuated to create a reverse air pulse to drive accumulated dust off the filter assembly. The dust then lands on the concave, funnel-shaped second plate or separator plate, and works its way down into the vortex tube, and continues down into the dust collection drum. A gate valve at the intake or air inlet can be used in conjunction with this feature to optimize the cleaning effect of the reverse pulse.

In practice, the dust collection drum receives the vast majority of the dust (typically, 99%+) from the vacuum cleaner air stream. The filter cartridge only deals with the very fine dust that is not separated out in the cyclonic chamber.

In operation, an air stream containing entrained dust passes from the flexible intake hose and through the intake conduit into the cyclonic separator at the lower part of the conic body; the vast majority of the dust is separated out here and drops into the dust collection drum. Then, the air stream exits upwards through the vortex tube into the filter chamber just above it in the upper part of the conic body. The majority of the remaining fine dust particles are caught in the final filter cartridge. The air flow continues in a radially inward direction through the final filter cartridge (HEPA) and from there through the central air passage of the top plate, into the intake duct of the vacuum blower. The vacuum blower exhausts clean, filtered air into the ambient.

The dust collection drum can include a hold-down feature for securing a flexible film bag liner within the drum. Such a hold-down feature can include a vacuum conduit penetrating a lower portion of the drum.

The vacuum cleaner arrangement of this invention can operate continuously for long periods without interruption, as 95 to 99+ percent of the collected dust is separated out by the cyclonic separator portion and is deposited into the dust collection drum. The machine of this invention has an advantage of increased fire safety, as the collected dust, which may present a danger of flame or explosion, is blocked from re-entering the ambient air. Industrial hygiene is vastly improved, as well, as dust and particulates (which may be toxic or carcinogenic) are kept out of the breathing air.

In order to reduce the risk of conflagration or explosion as much as possible, an anti-deflagration screen is employed in the process air stream, following the final filter, i.e., after the air stream has passed through the filter cartridge.

Stated more generally, the present invention may be implemented as a portable cyclonic vacuum cleaner in which a cyclonic chamber is formed of a conic body having a conic wall, a transverse wall closing off an upper end of the conic wall, and a narrow nose at a lower end of the conic wall. A vortex tube penetrates a center of the transverse wall and descends into the cyclonic chamber. An inlet conduit penetrates the conic wall below the transverse wall and introduces into the cyclonic chamber a flow of air in which dust particles are entrained. The majority of the dust particles are separated out here, and descend out the lower nose. The air inlet conduit may also attach to a vacuum hose.

A dust collection drum is positioned below said nose, and a drum lid closes off a top of the dust collection drum. The drum lid has a central dust inlet opening, with the nose of the cyclonic chamber being coupled to the dust inlet opening of the drum lid. This forms a dust seal with the nose to block leakage of external air into the cyclonic chamber and the drum.

A filter chamber is positioned in the flow of air after the air exits the vortex tube of the cyclonic chamber. A filter chamber housing has an inlet receiving air that exits the vortex tube, and a cover plate that is removably mounted onto the filter chamber housing. There is a discharge opening at the center of the cover plate. An air filter cartridge, favorably a HEPA cylindrical cartridge filter, is situated within the filter chamber housing. The air filter cartridge has an open core and filter media surrounding the open core. The core is accessible at least at one end. The filter cartridge is supported on the cover plate with the open core of the filter aligned with the discharge opening of the cover plate, such that air discharged from the cyclonic chamber into said filter chamber passes through the filter media into the open core, and then exits out the discharge opening into an associated vacuum blower.

The vacuum blower is supported on the cover plate, which also serves as motor plate. The vacuum blower has a suction port positioned against the discharge opening of the cover plate, so that the vacuum blower creates the air flow into and through said cyclonic chamber, and then into the filter chamber, through the filter media and out the discharge opening into the vacuum blower suction port. The vacuum blower then discharges the cleaned, filtered air to the ambient.

In this embodiment an anti-deflagration screen is mounted upon the discharge opening of the cover plate of the filter chamber, so that the air exiting the filter core passes from the open core of the filter cartridge through the screen and into the suction port of the vacuum blower. The anti-deflagration screen is favorably formed as a metal mesh screen, creating a multiplicity of small passages to permit exhaust air flow from the filter chamber but blocking any flame front. In this embodiment, the filter cartridge is a cylindrical filter cartridge, but other cartridge shapes are available, and the vacuum cleaner could be adapted to employ them.

A filter mount is attached to the inner (e.g., under) side of the cover plate, and has cylindrical male member adapted to fit snugly within one end of the open core of the cartridge filter. A ring flange at one end of the cylindrical member is mounted, e.g., by bolts, onto the cover plate so that the filter mount surrounds the discharge opening. The generally circular anti-deflagration screen is secured between the cover plate and the ring flange, with a circumferential edge portion of the anti-deflagration screen sandwiched between the ring portion and the cover plate. In the favorable embodiment, the anti-deflagration screen has a domed center portion thereof oriented to protrude into the cylindrical member of said filter mount, i.e., towards the core of the filter. The domed construction of the increases the surface area of the anti-deflagration screen, to minimize loss of vacuum at this point.

The cartridge filter can be secured onto the mount by an elastic strap that is stretched over the opposite end of the cartridge filter and then has its own ends removably secured to hooks or other anchor members disposed on the cover plate diametrically opposite one another with respect to the discharge opening.

The above and many other objects, features, and advantages of this invention will become apparent from the ensuing detailed description of one preferred embodiment, which is illustrated in the accompanying Drawing.

BRIEF DESCRIPTION OF THE DRAWING

FIG. 6 is a cross section of the filter mounting ring and the associated anti-deflagration or flame suppressor screen.

FIG. 7 shows an alternative embodiment of the anti-deflagration screen of this invention.

DETAILED DESCRIPTION OF A PREFERRED EMBODIMENT

Figure 1:
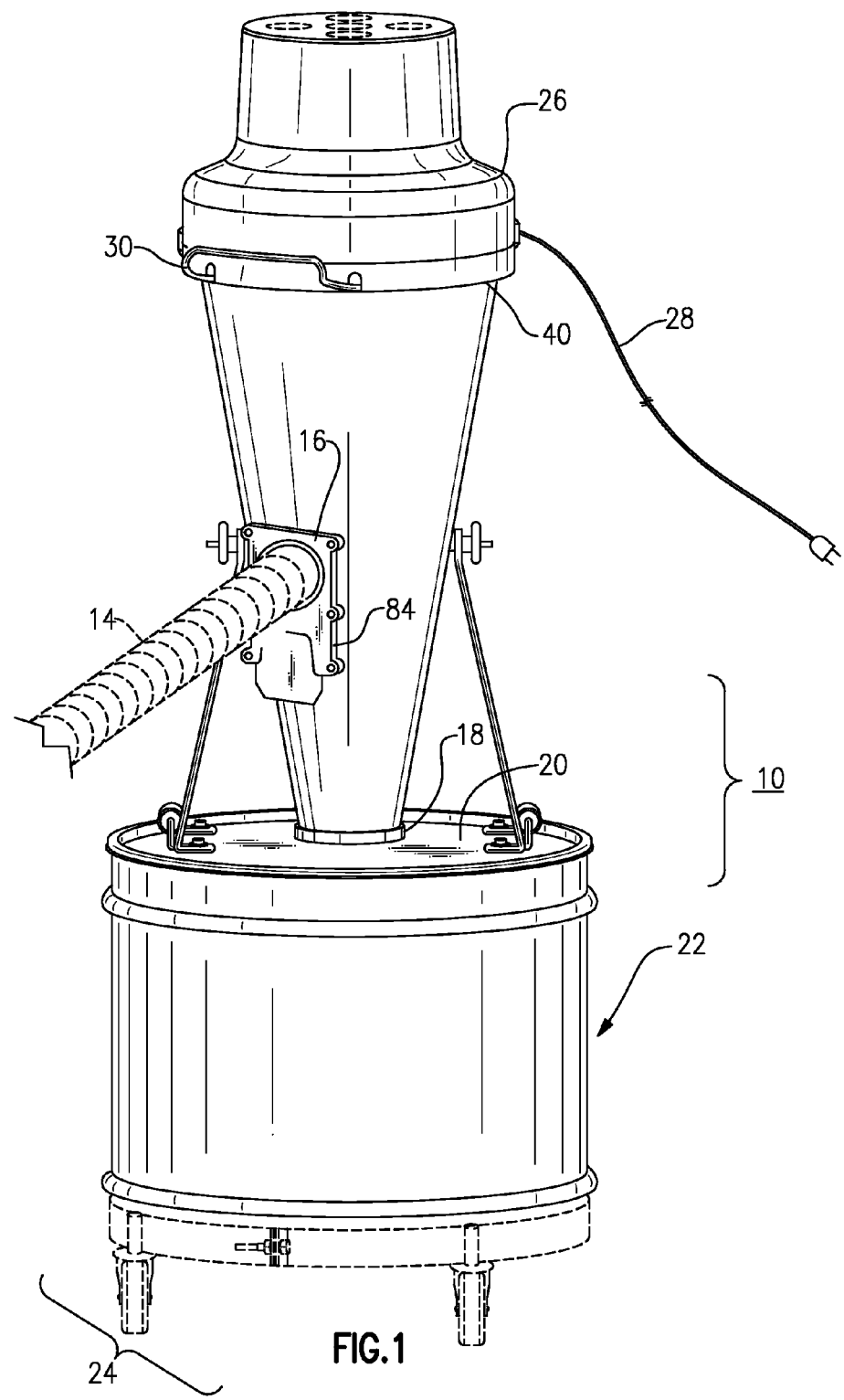
FIG. 1 is a perspective system view of a portable cyclonic vacuum cleaner device according to one embodiment of this invention.
Figure 2:
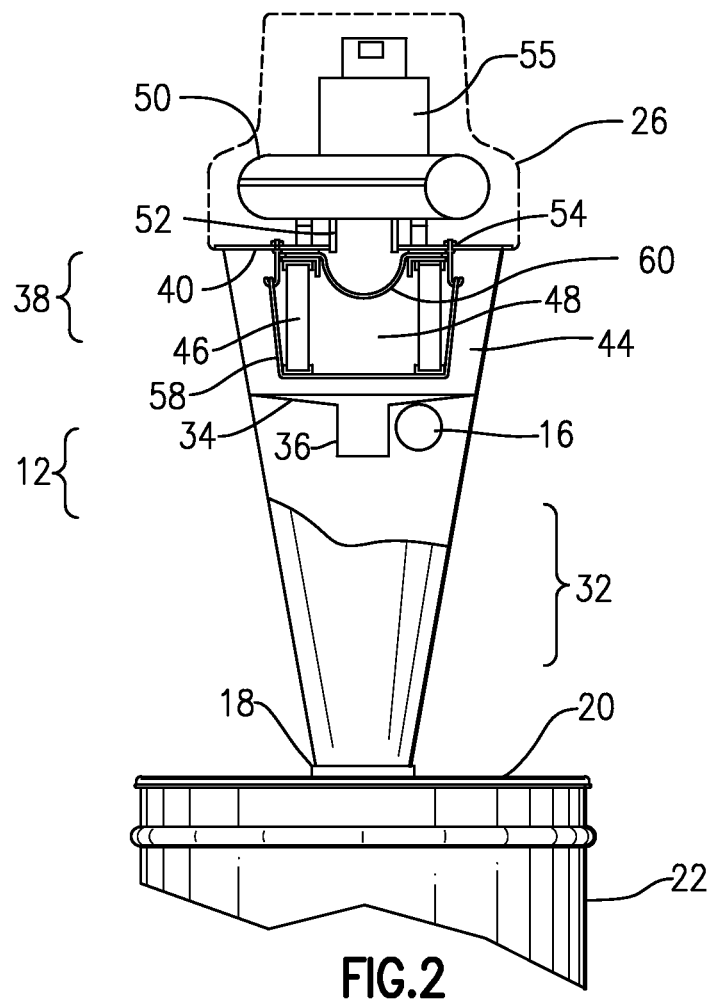
FIG. 2 is a cross-sectional elevation thereof, with an upper shroud thereof being shown in broken line.

Now, with reference to the Drawing, and initially to FIGS. 1 and 2, a portable cyclonic vacuum cleaner 10 according to an embodiment of this invention gathers and separates dust cyclonically from the air flow in which the dust is entrained, with the leaving air being cleaned in a final filter and returned to the ambient as clean, filtered air.

The cyclonic vacuum cleaner 10 is based on conic body 12, that is, a cone-shaped shell with a mouth or wide end at its top and a narrow nose at its bottom end. A vacuum hose 14 is attached onto an intake pipe 16 or air inlet penetrates the conic body 12 at a point about half-way between the mouth and the nose. The hose 14 can be connected to a scoop or other vacuum cleaner tool, or may be connected to a dust producing tool or appliance, such as a sander or saw. In this embodiment, the hose 14 and intake pipe 16 have a nominal 2.5 inch diameter. The intake pipe or inlet 16 can be shouldered and tapered to allow it to accommodate a wide range of standard hose diameters.

A flange 18 at the lower nose of the conic body 12 is affixed to both the conic body and to the center of a drum lid 20, which is fitted onto the top of a dust barrel or drum 22. A carriage 24 here is shown as a plurality of wheels or casters mounted at the base of the drum 22.

At the top of the unit is a motor compartment, here covered with a shroud or cover 26. Also shown here are an AC power cord 28 and a dust cleaner pulsing handle 30, to be described in more detail later. Also, a motor plate 40 serves as an upper plate for the top end of the conic body 12 and also serves as the base of the motor compartment.

As shown schematically in FIG. 2, in this embodiment, the conic body is divided into a cyclonic chamber 32 (formed in the lower half of the conic body 12) and a filter chamber 38 (formed in the upper half). A separator plate 34 which is positioned just above the position of the intake pipe 16, defines the upper end or top of the cyclonic chamber 32, and the lower nose defines the lower end of the cyclonic chamber. A vortex tube 36 descends from the center of the separator plate 34 down a short distance along the axis of the conic body. The air flow entering the cyclonic chamber via the intake pipe 16 proceeds around the vortex tube 36, then spirals along the inside conic wall of the chamber to the nose, then proceeds upwards along the axis of the cyclonic chamber and out through the vortex tube into the filter chamber 38 positioned just above.

The separator plate 34 defines the lower wall of the filter chamber 38, and the motor plate 40, which is secured to the open top of the conic body 12, defines the upper wall of the chamber 38. There is a filter holder 42 positioned at the axis of the conic body 12 on the underside of the motor plate 40, and positioned around an outlet opening in the motor plate. Here, the filter holder 42 is favorably in the form of a ring flange with a short cylindrical male portion that extends into a corresponding open end of a cartridge filter 44.

The filter 44 is in the form of a cylindrical cartridge filter, with a cylinder of filter media 46 surrounding an open core 48 or center at the axis of the filter 44. Here, the lower end of the filter, i.e., the end away from the motor plate, is a closed disk. All of the air that enters the filter chamber 38 through the vortex tube 36 from the cyclonic chamber 32, has to flow radially inwardly through the media 46 to the open core 48 of the filter 44, and then proceeds out through the outlet opening in the motor plate 40.

In this embodiment, the motor compartment beneath the shroud 26 contains a blower vac unit 50, here a centrifugal air pump, which is oriented along the axis of the unit, and is mounted on the top side of the motor plate 40. An intake duct 52 of the blower vac extends downward into and through the outlet opening 54 in the motor plate. An AC induction motor 55 is positioned above the blower vac unit.

Also shown here is a retainer strap 58 for the filter cartridge 44 which passes under the filter cartridge and is secured by hooks to the motor plate on opposite sides of the filter holder 42.

Figure 3:
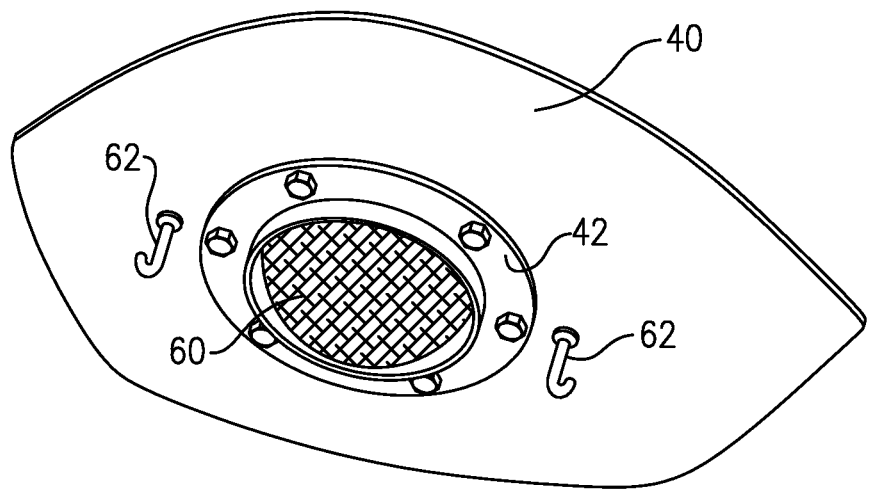
FIG. 3 is a perspective view of the underside of the motor plate of this embodiment, showing the filter mounting ring, flame suppressor screen, and filter hold-down strap retaining hooks.

Details of the under side of the motor plate 40 are shown in FIG. 3. Here the filter holder 42 is shown bolted around the center of the motor plate 40, and in this case the filter holder 42 also serves to hold down an anti-deflagration screen 60. The screen 60 protrudes down into the core of the filter cartridge, and all of the air stream that leaves the filter chamber 38 has to pass through the anti-deflagration screen 60. This ensures that any flame front that might occur from a sudden ignition of dust in the air stream will be stopped at this point before the air stream is drawn through the blower vac and exhausted to the ambient. Also shown here are a pair of hook members 62, 62 that are affixed to the underside of the motor plate 40 at points diametrically opposite one another around the filter holder 42.

Figure 4:
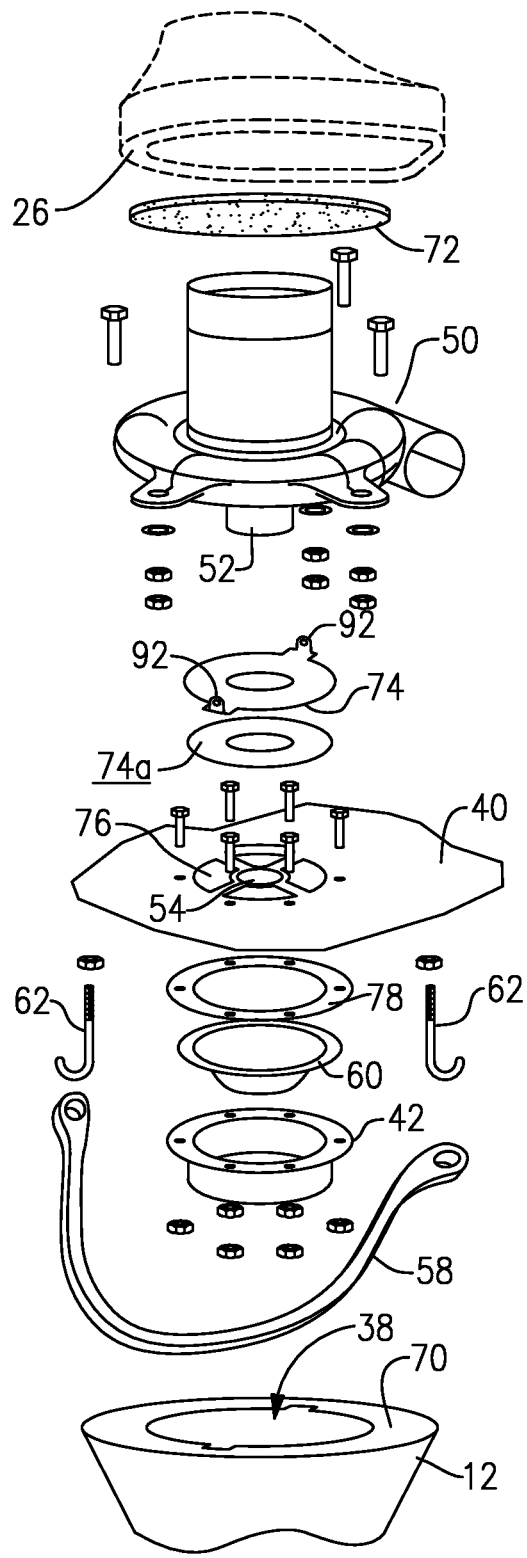
FIG. 4 is an assembly view of the portable cyclonic vacuum cleaner of this embodiment.

FIG. 4 is an assembly view or exploded view showing the construction of the components that are supported on the underside of the motor plate 40 within the filter chamber 38, and those which are supported on top of the motor plate 40 within the motor compartment 26. The filter mount 42, anti-deflagration screen 60, filter strap 58 and hook members 62 have been described earlier. A number of bolts, nuts, washers and other small members are shown, but not described in detail. The blower vac 50 and shroud have been described earlier as well.

A ring flange 70 is welded in place along the inner edge or rim at the top of the conic body 12. The motor plate 40 is seated here against this flange 70, with a gasket (not shown) positioned between them. The motor plate 40 is removably secured here using clamps (not shown).

A cowling screen 72 or foam member is positioned within the shroud, and serves as a noise absorber or sound deadener.

A pulse plate 74, here in the form of an annular plate or open-center disk, is employed for reverse-pulse air-blast cleaning of the filter 44. The plate 74 encircles the intake conduit 52 of the blower vac 50, and also surrounds the central opening 54 of the motor plate. There is an annular opening 76 in the motor plate surrounding the central opening 54; the annular opening being formed of a number of penetrations encircling the central opening. The plate 74, which includes a pulse plate gasket 74a secured to its underside, rests on this annular opening 76, and is normally held sealed against it by the vacuum present in the core of the filter 44. The pulsing handle 30, mentioned earlier, enters the shroud through a pair of openings, and is attached to the pulse plate 74 at two upstanding ears. This construction allows an operator to lift the plate 74 by pushing down on the lever 30 to allow ambient air from the motor compartment to pass down through the annular opening 76 into the core 48 of the filter, with the sudden burst of air creating an outward pulse to blast accumulated dust from the filter media 46. When that occurs, the dust falls down to the separator plate 34, which is somewhat cone shaped in this embodiment, and the dust then proceeds downward through the vortex tube and through the nose of the conic body into the dust collection drum. As soon as the operator releases the lever, the vacuum within the filter chamber pulls the annular pulse plate 74 back into place, so that normal vacuum cleaning and dust separation can continue.

As also shown in FIG. 4, a gasket 78 is provided to form a seal between the outer circumferential edge of the anti-deflagration screen 60 and the under side of the motor plate 40. These are secured in place by the bolt flange of the filter holder 42, which is secured by bolts, nuts and washers.

Figure 5:
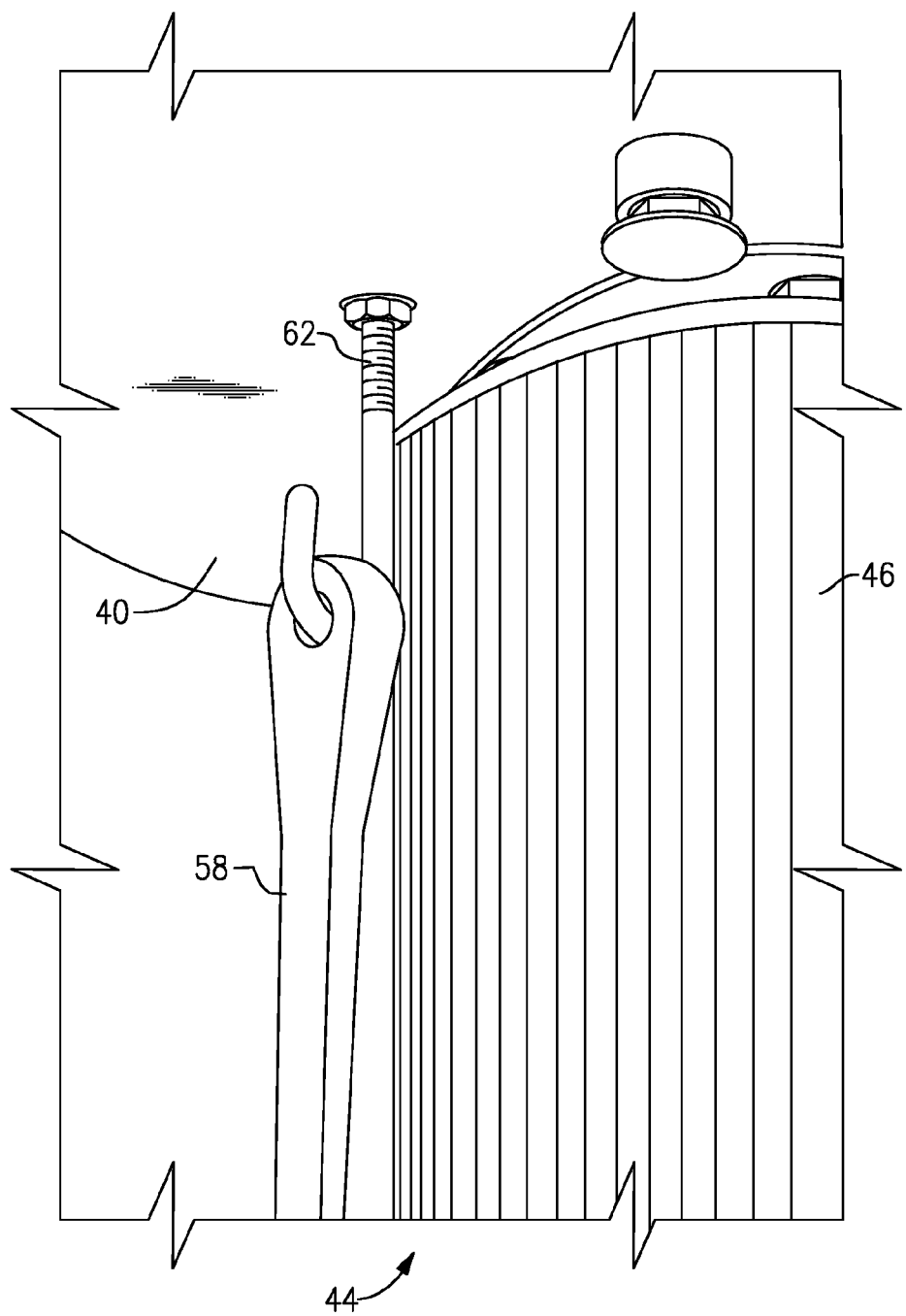
FIG. 5 shows a portion of the elastic hold-down strap.

FIG. 5 shows some detail concerning the retaining strap 58, which can in practice be a rubber strap having round openings at each end to be secured onto the hook members 62. In normal operation, the tight fit of the filter 44 onto the filter holder 42 is sufficient to keep it in place. However, in a pulse cleaning operation, the reverse air pressure exerts a downward force onto the filter, and the strap 58 ensures that the filter 44 does not get blown off the mount 42. Other equivalent members could be employed in place of the rubber strap, such as a spring retainer or bungee cord.

As shown in FIG. 6, the anti-deflagration screen 60 is favorably formed as a generally hemispherical dome that protrudes down into the inside of the filter holder 42. The anti-deflagration screen is a metal mesh and quenches any flame front that encounters it to extinguish a deflagration before passing beyond, to the motor vac and the exterior environment. The hemispherical shape creates twice as much surface area as a flat disk, which results in less resistance to air flow. In some cases, a different domed shape could be employed for the anti-deflagration screen such as a conic or frustoconic shape.

As also shown here, the filter holder 42 has a male cylindrical or tubular member 80 and a flat or planar bolt ring 82, the latter being used to secure the circumferential edge of the screen 60 and the associated gasket 78 against the bottom of the motor plate.

FIG. 7 shows one possible alternative embodiment of an anti-deflagration screen 160, here having the screen formed into a 40-mesh hemispherical dome, as with the embodiment just described, but with an over-molded ring seal 142 of a durable, semi-rigid plastic resin formed at the outer rim of the screen 142. Other variants beyond this one are also possible.

In operation, a stream of air that is picked up by the vacuum tool, with entrained dust particles, travels through the intake vacuum hose 14 and enters through the intake pipe 16 into the cyclonic chamber 32, i.e., the cyclonic separator portion of the unit. The air stream then proceeds around the vortex tube 36 and continues on a downward spiral path towards the lower nose of the cyclone. The dust separates against the side of the cyclone chamber and descends down, out the lower nose and into the dust collection drum 22. The air stream, from which the large majority of dust has been separated, then proceeds up the center of the cyclone, and out the vortex tube 36, through the separator plate 34, and into the filter chamber 38. The air moves up around the outer periphery of the filter cartridge 44 and then passes radially inward through the filter media, then passed up through the central opening 54 of the motor plate, and into the intake conduit 52 of the blower vac or centrifugal pump. The air exhausts out an exhaust port of the pump, diffuses around the interior of the shroud, and passes out through openings provided in the upper part of the shroud, back to the ambient. The air exhausted from the unit into the ambient is clean, filtered air, with over 99.97 percent of the dust (down to 0.3 microns) separated from the air stream, where the filter is HEPA rated.

The operator can use this vacuum cleaner for an extended period of time, and does not need to interrupt the operation for the purpose of unclogging or emptying bags or filters. There is improved fire safety as combustible dust particles are entirely filtered out and contained, and are kept from the ambient air. In addition, any spark or deflagration that may be generated by the dust-producing tool, if it should happen to travel through the vacuum hose 14 into the system, will be halted at the deflagration screen 60 before it can exit into the ambient and (potentially) cause an explosion.

The filter service interval for filter 60 is also very long, and pressure loss through the filter cartridges is kept low, due to the efficiency of the pre-separation within the cyclone chamber. The filtration of air and separation of dust vastly improves the industrial hygiene for the operator.

The filter cleaning mechanism, which comprises the lever 30, positioned externally of the shroud 26, together with the pulse plate 74 functions to blow accumulated dust off the filter media.

After some period of operation, when the operator desires to blast the dust from the cylinder, the operator can remove the hose 14 from the intake pipe 16 and block that with his or her hand. Alternatively, a gate valve at the intake pipe 16 can be closed off. Then the operator can push down once or twice on the 30. This action raises the annular pulse plate 74 off its seat to open the annular opening 76. This allows the higher-pressure air above the motor plate 22 to flood into the space within the open core of the filter cartridge 44, producing a pulse of air in the reverse direction, i.e., from inside to outside of the filter media. This blasts off any dust particles that have accumulated on the outside surface of the filter media. The particles fall down, onto the separator plate 34, and because of the conic shape of the separator plate, the particles follow the slope down to the vortex tube 36 and fall from there, through the cyclonic chamber, and into the dust collection drum. When the lever is released, vacuum brings the pulse plate 74 back onto its seat, and normal vacuum cleaning operations can be resumed.

An alternative arrangement of the filter reverse pulse mechanism are possible, and would not affect the operation of the anti-deflagration screen of this invention.

Within the shroud, the silencer screen may preferably be formed of a porous foam material so that the leaving exhaust air will exit easily.

An alternative arrangement of the portable cyclonic vacuum cleaner could employ a wall mounting plate for attaching to a vertical wall surface, rather than being set up to roll about on wheels or casters.

The anti-deflagration screen can also be employed with a shop vacuum cleaner, cyclonic or non-cyclonic, where dust separated from the air flow settles into a dust collection drum portion, and the air flow enters a filter chamber portion and passes through filter media of a cylindrical air filter cartridge, and then out from the open core of the cartridge through a discharge opening of the cover or cover plate against which the filter is mounted, so that filtered air enters the suction port of a vacuum blower and is discharged to the ambient. The anti-deflagration screen can be mounted between the filter cartridge and the cover plate, so that any flame front is blocked before it enters the vacuum blower.

Also, while the preferred embodiment has the cyclonic chamber and filter chamber formed more-or-less unitarily within a single conic body, the principles of this invention could easily be practiced in a cyclonic dust collector/vacuum cleaner where the cyclonic chamber and filter chamber are built separate from one another, as is frequently the case.

While the invention has been described hereinabove with reference to a preferred embodiment and variants thereof, it should be apparent that the invention is not limited to such embodiments. Rather, many variations would be apparent to persons of skill in the art without departing from the scope and spirit of this invention, as defined in the appended Claims.

We claim:

1. A portable cyclonic vacuum cleaner that comprises
a cyclonic chamber formed of a conic body having a conic wall, a transverse wall closing off an upper end of said conic wall, and a narrow nose at a lower end of the conic wall, a vortex tube penetrating a center of said transverse wall and descending into said cyclonic chamber, and an inlet conduit penetrating said conic wall below said transverse wall and adapted to introduce into said cyclonic chamber a flow of air in which dust particles are entrained, said air inlet conduit also being adapted to attach to a vacuum conduit;
a dust collection drum positioned below said nose, having a drum lid closing off a top of the dust collection drum, the drum lid having a dust inlet opening, with means coupling the nose of the cyclonic chamber to the dust inlet opening of said drum lid, forming a dust seal with said nose to block leakage of external air into the cyclonic chamber and the drum;
a filter chamber positioned in the flow of air after said cyclonic chamber, having a housing, an inlet receiving air that exits the vortex tube of the cyclonic chamber, and a cover plate that is removably mounted on said filter chamber housing and having a discharge opening, an air filter cartridge disposed in said housing, the air filter cartridge having an open core and filter media surrounding said open core, and means supporting the filter cartridge on said cover plate with the open core aligned with said discharge opening, such that air discharged from the cyclonic chamber into said filter chamber passes through said media to said open core and exits out said discharge opening;

a vacuum blower supported on said cover plate and having a suction port positioned against the discharge opening of said cover plate, to create said air flow into said cyclonic chamber, and then into said filter chamber, through said filter media and out said discharge opening into said vacuum blower suction port;

the improvement which comprises an anti-deflagration screen mounted within the discharge opening of the cover plate of the filter chamber, and through which filtered air passes in its path from the open core of the filter cartridge into the suction port of the vacuum blower; the anti-deflagration screen being in the form of a metal mesh creating a multiplicity of small passages to permit exhaust air flow from the filter chamber but blocking any flame front, the metal mesh screen defining a pore size selected to permit exhaust air from the filter chamber to flow through but to block any flame front and absorb combustion heat of the flame front.

2. The portable cyclonic vacuum cleaner according to claim 1 wherein said anti-deflagration screen is in the form of a circular screen member having a center thereof formed into a hemispheric dome.

3. The portable cyclonic vacuum cleaner according to claim 1 wherein said filter cartridge includes a cylindrical filter cartridge.

4. The portable cyclonic vacuum cleaner according to claim 3 wherein said means supporting the filter cartridge comprises means securing the cylindrical filter cartridge sealably against the cover plate of said filter chamber, and surrounding said discharge opening.

5. The portable cyclonic vacuum cleaner according to claim 4 further comprising a filter mount that includes a cylindrical member adapted to fit snugly within one end of the open core of said cartridge filter, and a ring flange at one end of the cylindrical member and mounted onto the cover plate of said filter chamber surrounding said discharge opening, and retaining an edge portion of said anti-deflagration screen between said ring portion and said cover plate.

6. The portable cyclonic vacuum cleaner according to claim 5 wherein said anti-deflagration screen is in the form of a circular screen member having a domed center portion thereof oriented to protrude into the cylindrical member of said filter mount.

7. The portable cyclonic vacuum cleaner according to claim 5 wherein said means securing the cylindrical filter cartridge further comprises an elastic strap stretched over said cartridge filter and having ends removably secured to anchor hook members disposed on said cover plate diametrically opposite one another with respect to said discharge opening.

8. The portable cyclonic vacuum cleaner according to claim 1 wherein said anti-deflagration screen is in the form of a circular screen member having a center thereof formed into a hemispherical dome, having substantially twice the area of said filter chamber discharge opening.

9. The portable cyclonic vacuum cleaner according to claim 1 wherein said anti-deflagration screen has a mesh size of 40-mesh.

10. A portable vacuum cleaner that comprises
a vacuum chamber with an inlet conduit penetrating the vacuum chamber to admit therein a flow of air in which dust particles are entrained, the air inlet conduit being adapted to attach to a vacuum conduit;
a dust collection drum portion positioned below said vacuum chamber and into which dust particles separated from said flow of air are allowed to settle and collect;
a filter chamber portion positioned in the flow of air and having an air filter cartridge disposed therein, the air filter cartridge having an open core and filter media surrounding the open core, with a cover plate adapted to seal against said cartridge filter and having a discharge opening aligned with the open core of said air filter cartridge;
a vacuum blower supported on said cover plate and having a suction port communicating with the discharge opening in said cover plate to create an air flow into said vacuum chamber, and then through the filter media of said air filter cartridge, into said open core, and then out the discharge opening in said cover plate; and
the improvement which comprises an anti-deflagration screen mounted within the discharge opening of the cover plate of the filter chamber, and through which filtered air passes in its path from the open core of the filter cartridge into the suction port of the vacuum blower; the anti-deflagration screen being in the form of a metal mesh creating a multiplicity of small passages to permit exhaust air flow from the filter chamber but blocking any flame front, the metal mesh screen defining a pore size selected to permit exhaust air from the filter chamber to flow through but to block any flame front and absorb combustion heat of the flame front.

11. The portable vacuum cleaner according to claim 10, wherein the anti-deflagration screen is in the form of a circular screen member having a center thereof formed into a hemispherical dome.

12. The portable cyclonic vacuum cleaner according to claim 10 wherein said anti-deflagration screen has a mesh size of 40-mesh.

* * * * *